US012395633B1

(12) United States Patent
Sun et al.

(10) Patent No.: US 12,395,633 B1
(45) Date of Patent: Aug. 19, 2025

(54) SYSTEMS AND METHODS FOR VIDEO DECODER MANAGEMENT

(71) Applicant: Meta Platforms, Inc., Menlo Park, CA (US)

(72) Inventors: Yu-Chen Sun, Bellevue, WA (US); Shyam Sadhwani, Bellevue, WA (US); Yun Zhang, Newark, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 329 days.

(21) Appl. No.: 17/992,667

(22) Filed: Nov. 22, 2022

Related U.S. Application Data

(60) Provisional application No. 63/344,448, filed on May 20, 2022, provisional application No. 63/344,450, filed on May 20, 2022.

(51) Int. Cl.
*H04N 19/127* (2014.01)
*H04N 19/42* (2014.01)

(52) U.S. Cl.
CPC .......... *H04N 19/127* (2014.11); *H04N 19/42* (2014.11)

(58) Field of Classification Search
None
See application file for complete search history.

(56) References Cited

U.S. PATENT DOCUMENTS

| 11,818,373 B1* | 11/2023 | Mama ................. H04N 7/152 |
| 2006/0168637 A1* | 7/2006 | Vysotsky ............ H04L 12/1813 725/116 |
| 2013/0135427 A1* | 5/2013 | Wu .................. H04N 21/23439 348/14.09 |
| 2017/0310342 A1* | 10/2017 | Yen ..................... H03M 13/3715 |
| 2019/0165815 A1* | 5/2019 | Moision ............ H03M 13/2792 |
| 2021/0144393 A1* | 5/2021 | Toda .................... H04N 19/112 |
| 2022/0191055 A1* | 6/2022 | Christensen .......... H04N 7/155 |
| 2022/0368946 A1* | 11/2022 | Ding ................... H04N 19/105 |

* cited by examiner

*Primary Examiner* — Duc Nguyen
*Assistant Examiner* — Assad Mohammed
(74) *Attorney, Agent, or Firm* — Eversheds Sutherland (US) LLP

(57) ABSTRACT

Methods, systems, and storage media to determine an available number of hardware decoders that can be used to process a video feed. The system can receive a select group of participants from a plurality of participants associated with the video call. The system can include identify a video feed for each participant of the select group of participants. The system can send a request for the video feed of each participant of the select group of participants. The system can receive a video feed associated with each of the select group of participants in the video call. The system can allocate a hardware decoder to each participant of the select group based on the request for each video feed. The system can determine operational parameters of at least one of the hardware decoders. The system can include switching the video feed from the hardware decoder to the software decoder.

11 Claims, 6 Drawing Sheets

SYSTEMS AND METHODS FOR VIDEO DECODER MANAGEMENT

CROSS REFERENCE TO RELATED APPLICATIONS

This application claims priority under 35 U.S.C. § 119(e) to U.S. Provisional Patent Application No. 63/344,448 filed May 20, 2022 and U.S. Provisional Patent Application No. 63/344,450, filed May 20, 2022, the disclosure of which is hereby incorporated by reference in its entirety for all purposes.

TECHNICAL FIELD

The present disclosure generally relates to managing video decoding and, more particularly, to managing video decoders for a plurality of callers.

BACKGROUND

Most mobile devices have a limit on the maximum number of hardware decoders the mobile device can create. The user joins a call that exceeds the maximum hardware decoder instances the mobile device can create.

BRIEF SUMMARY

The subject disclosure provides for defining similarities of various forms of content including: text, video, and photo. The disclosure addresses the problem of establishing similarities between the post content associated with a query. The solution addresses the problem of predicting future engagement by a user on the platform by correlating the content of the posts. The similarities determined can be used to predict future engagement and generate suggested content that can be provided to the user of the platform.

One aspect of the present disclosure relates to a method for requesting select members of a video feed. In an exemplary method, the disclosure comprises identifying a plurality of hardware decoders, wherein the hardware decoders facilitate a video call. The method comprises receiving a select group of participants from a plurality of participants associated with the video call. The method comprises identifying a video feed for each participant of the select group of participants. The method comprises sending a request for the video feed of each participant of the select group of participants. The method comprises receiving a video feed associated with each of the select group of participants. The method also comprises allocating a hardware decoder for the plurality of hardware decoders to each participant of the select group based on the request for each video feed.

Another aspect of the present disclosure relates to a system configured for mapping similarities between content into a hyperspace. The system may include one or more hardware processors configured by machine-readable instructions. The processor(s) may be configured to identify a plurality of hardware decoders, wherein the hardware decoders facilitate a video call. The processor can determine an available number of hardware decoders that can be used to process a video feed. The processor can receive a select group of participants from a plurality of participants associated with the video call. The processor can include identify a video feed for each participant of the select group of participants. The processor can send a request for the video feed of each participant of the select group of participants. The processor can receive a video feed associated with each of the select group of participants in the video call. The processor can allocate a hardware decoder to each participant of the select group based on the request for each video feed. The processor can determine operational parameters of at least one of the hardware decoders. The processor can include switching the video feed from the hardware decoder to the software decoder.

Yet another aspect of the present disclosure relates to a non-transient computer-readable storage medium having instructions embodied thereon, the instructions being executable by one or more processors to perform a method for requesting select members of a video feed. In an exemplary method, the disclosure comprises identifying a plurality of hardware decoders, wherein the hardware decoders facilitate a video call. The method comprises receiving a select group of participants from a plurality of participants associated with the video call. The method comprises identifying a video feed for each participant of the select group of participants. The method comprises sending a request for the video feed of each participant of the select group of participants. The method comprises receiving a video feed associated with each of the select group of participants. The method also comprises allocating a hardware decoder for the plurality of hardware decoders to each participant of the select group based on the request for each video feed. The method further comprises determining the operational parameters indicate a failure in the hardware decoder. The method can further include determining a failure rate of the hardware decoder. The method can further include decommissioning a hardware encoder and switching to a software encoder, based on the failure rate exceeding the replacement threshold after multiple test periods.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The difference between the types of content increases the difficulty in determining similarities between the posts. The techniques discussed in the disclosure identifies a basis for comparison across the photo, video, and text posts associated with a query. The subject disclosure provides for systems and methods for determining similarities between the posts. Once a relative similarity can be determined by a post, a mapping of the relative hyperspace between the query and post content can be generated. The resultant mapping can be used to further train a model to predict user engagement on the platform and generate content of interest for a user. Further, the mapping can be used for post-text retrieval and ranking.

Figure 1:
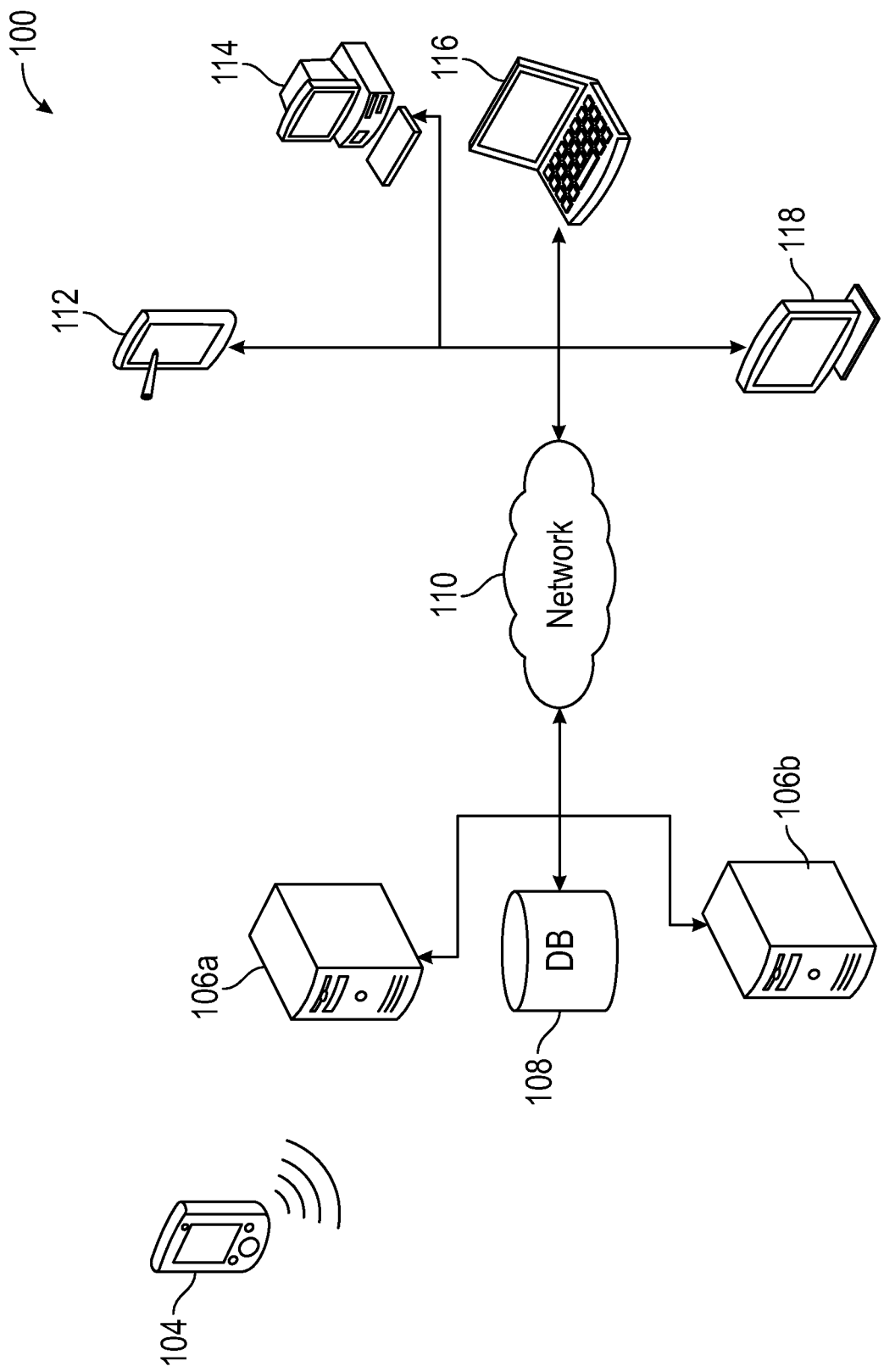
FIG. 1 illustrates an exemplary operating environment for client devices.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server which receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared social media content that can be subscribed to by other users. The database 108 may also be used to facilitate key rotation in a one to many encryption architecture by causing issue of new keys when a copy of a shared key becomes comprised, for example.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network. In some implementations, the server computing devices 106a-106b can be used as part of a social network such as implemented via the network 110. The social network can host content and protect access to the content, such as via the database 108, although the server computing devices 106a-106b of the social network do not have access to private keys and can be remote/separate from the application(s) that perform key generation and content encryption. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Figure 3:
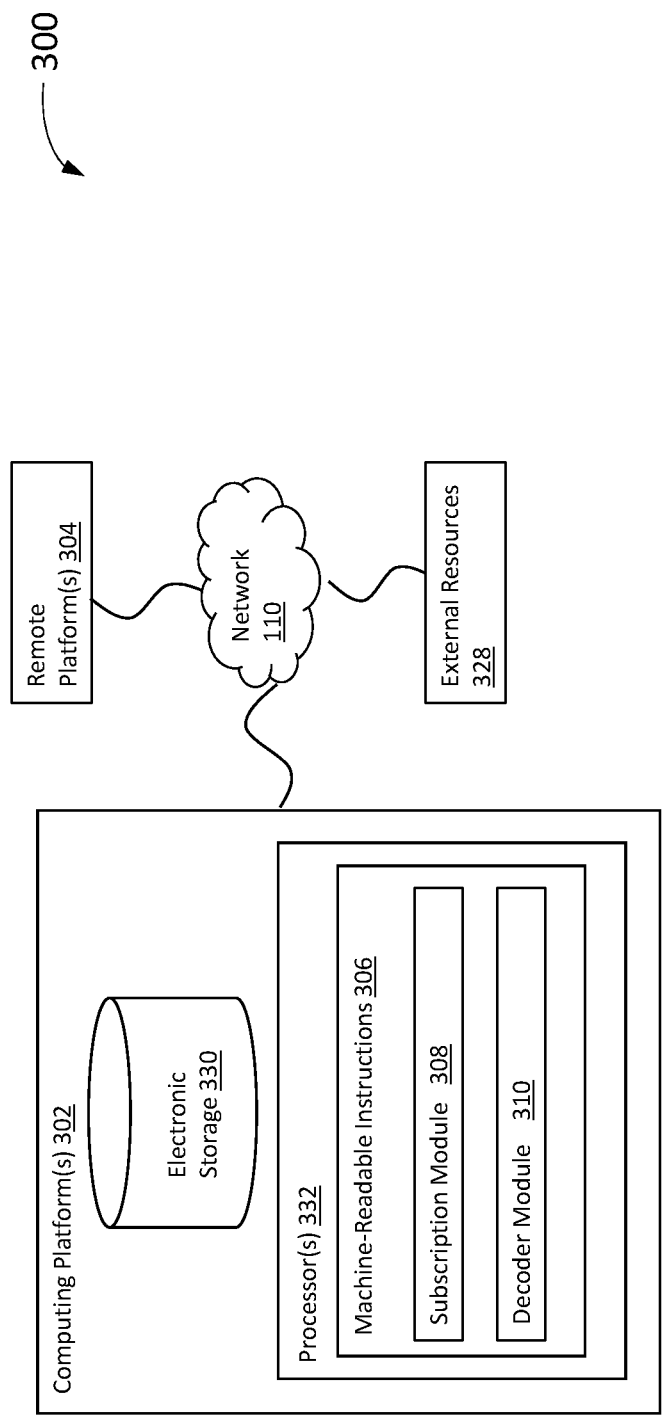
FIG. 3 is a block diagram illustrating an example computer system (e.g., representing both client and server) with which aspects of the subject technology can be implemented.

FIG. 3 illustrates a system 300 configured for providing ephemeral messages, according to certain aspects of the disclosure. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of subscription module 308 and decoder module 310, and/or other instruction modules.

Figure 2:
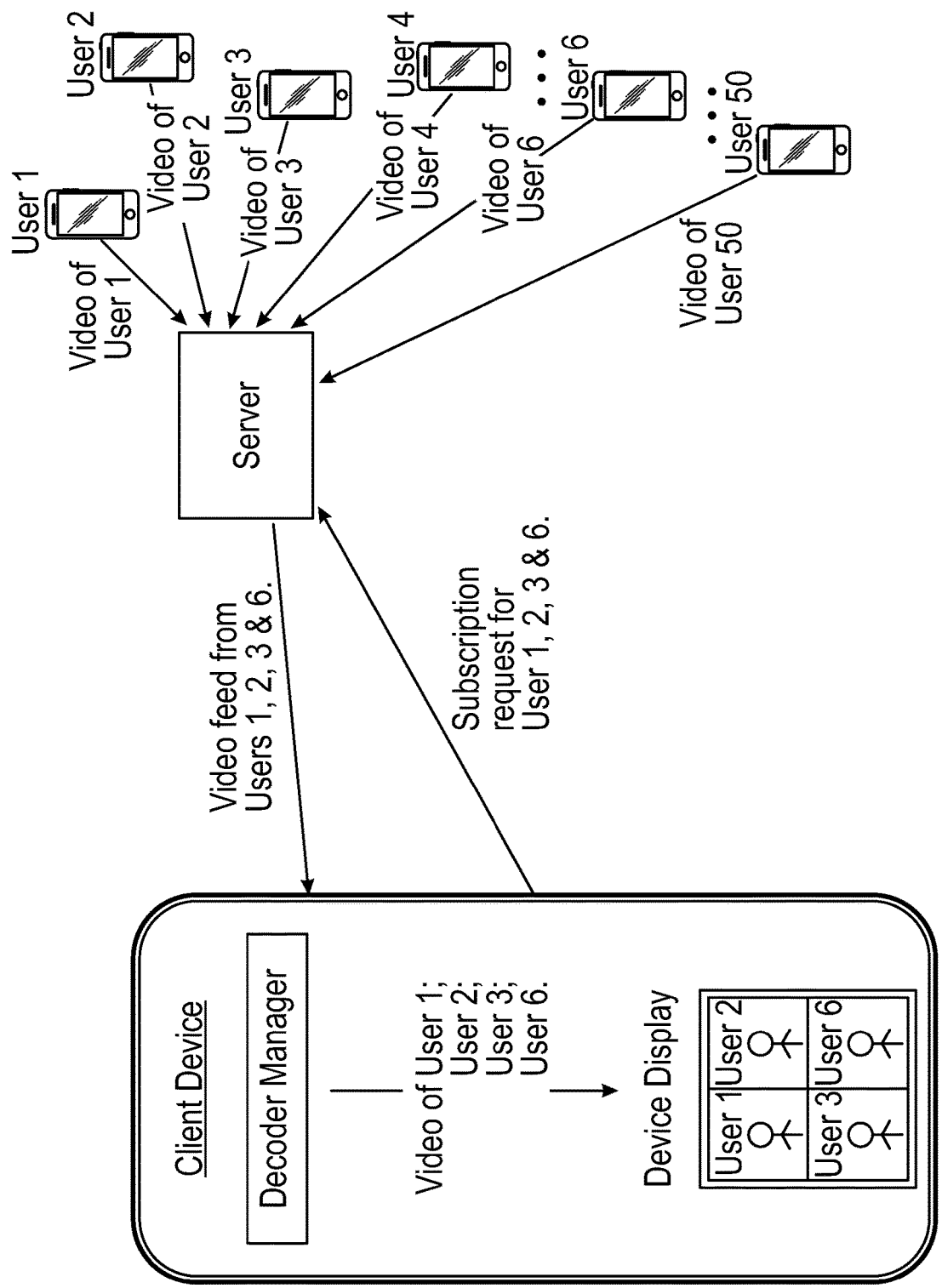
FIG. 2 illustrates a block diagram for of the environment of the subscription request between multiple video feed being sent to a single client device.

The computing platform can further comprise a subscription module 308. In an application layer of the computing platform, a client can send a message to the processor 332, indicating which user's video from an external resource 328 that the client wants to display on their device. Instead of sending all videos of the users in the call to the client, the processor can send the subscribed videos to the client. As depicted in FIG. 2, there is a plurality of users with various video feeds. Through the subscription module 308, The users that are capable of providing a video feed to the server. A client can request via the subscription module to a subset the multiple users. The subset {User 1, User 2, User3, User 6} respective video feeds can be provided to the decoder manager 310 for subsequent display on the client device. The client device can then display the user feeds from the requested (subscribed) users.

The computing platform can comprise a decoder module 310, that can function as a decoder manager. The client passes the subscription information to the decoder module 310 can be configured to release unused or unsubscribed decoders, to the amount of active decoders can be controlled within the limits of the available decoders. The decoder module 310 can also facilitate management between hardware video decoders and software video decoders. Software decoding uses the CPU to decode and read video, while hardware decoding is mainly based on GPU (graphics processing unit) to process video data instead of CPU. Hardware decoding cases CPU consumption in processing HD videos and can run other tasks, and even quickens the GPU render—making full use of the high efficiency of GPU for image processing. In comparing, the software decoder and the hardware decoder for use in a requested application, the decoder module 308 can be configured to evaluate certain factors, such as power consumption, resolution, bitrate, complexity or video format. For example, the software decoder can consume more power than a hardware decoder. If the video source is encoded by a standard algorithm like H.264 or H.265, both hardware and software encoders can do the job. Further, when considering format, the decoder module 310 may implement a software decoder when processing a less usual stream of MPEG-4, MPEG-2, VP8/9, DIVX, WMV. 3G2 formats.

During processing the decoder module 310 can implement a decoder manager to allocate video feeds between designated hardware and software decoders. When a request for a video feed is received from the subscription 308, decoder manager can determine whether one of the limited number of hardware decoders is available on the GPU or CPU. The decoder manager can also create a software decoder and register/assign the subscribed video feed with the created software decoder. As mentioned earlier, the manager may seek to implement a hardware decoder because of the decrease power consumption. The issue of power consumption can be extremely relevant when the client device being used is a mobile device with a limited power capacity from a battery.

In a further aspect, the decoder manager can allocate the usage of hardware decoders and the decoder manager can also manage the usage of unused and/or unsubsribed decoders. The management between used and unused hardware decoders has direct relation to power consumption of a client device because the hardware decoders use less power. Thus in certain embodiments of a system, allocation of hardware decoders will be allocated prior to a software encoder being initiated and allocated to a video feed of a subscription request. When considering the usage of the hardware decoder, the manager can also be re-initiated if it is not being used. For example, if the hardware decoder is initially being used for a particular video stream and the client via the subscription requests another video than the initially requested video feed, the manager can reinitiate a previously allocated decoder or identify an unused decoder for use. In a further aspect, the decoder manager can determine its management scheme based on the operating scheme run by the client device. For example, the decoder manager may base a preference for software decoders to hardware decoders for an Android operating system, while preferring hardware decoders to software decoders on Apple IOS. Such an example is exemplary but is indicative of the management protocol that the decoder manager can implement when implementing decoders.

The subscription request can also reinitiate a particular decoder if a particular participant is requested again. As a result, both releasing a decoder for use and re-initializing the decoder are processed by the decoder manager in the same thread (e.g., application main thread), wherein a thread is a codec or program. When a video frame comes later, the decoder manager will use the initiated decoder to decode the frame. In another aspect, the client device can assign and recall an assignment scheme for a hardware decoder most recently used. Additional factors can be applied to determine the assignment scheme for the hardware decoder including but not limited to: usage rate of the hardware decoder, recency of usage by the hardware decoder, bitrate, type of instance failure, and complexity. The complexity can be measured by the decoding time, the CPU usage, or the power spent on decoding frames. If the complexity is high, the decoder manager can prefer to use a hardware decoder. The factors can be applied in combination or individually to decide which stream to send to a hardware decoder and which stream to send a software decoder. An alternative embodiment for releasing a decoder for use and re-initializing the decoder can be executed in different video threads. The decoder manager can release a decoder for use in one thread when the corresponding participant is unsubscribed. The decoder manager can re-initialize a decoder in another thread once a video feed is received and the corresponding decoder has not been initialized.

In certain instances, the decoder manager can prefer to use the hardware decoder instead of the software decoder. The decoder manager can be further configured to evaluate the operation of the hardware decoder. For example, the decoder manager can assess overall performance of a hardware decoder and determine if the hardware decoder needs to be replaced. The analysis of the decoder manager becomes increasing important when the client device is an older device. In one embodiment, if the client device is an older device (legacy), a poorly performing hardware decoder could yield no video or crash. To address such a possibility, a hybrid decoder can be used and is managed by the decoder manager. A hybrid decoder can comprise a hardware decoder with a software decoder fallback.

Figure 5:
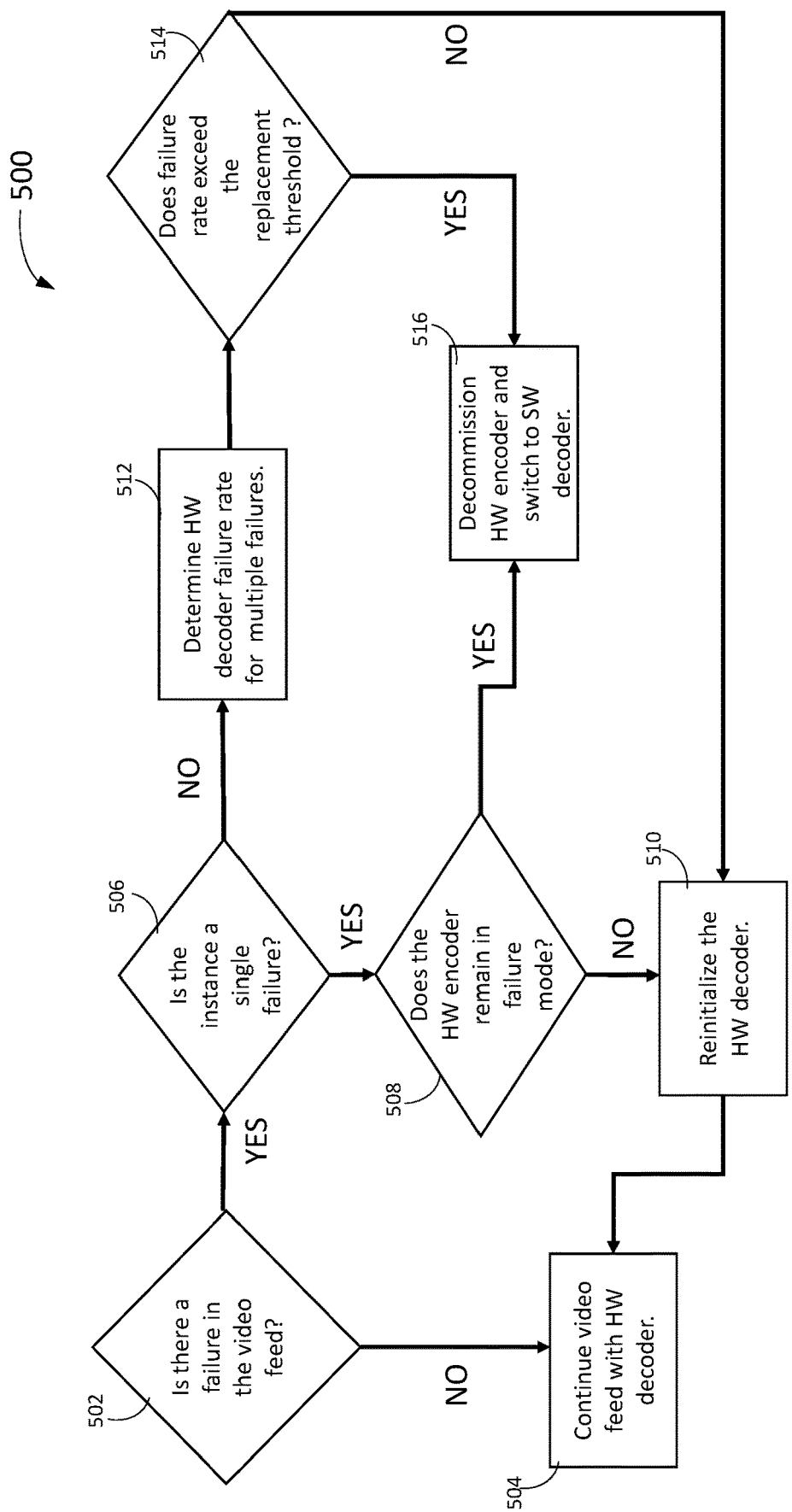
FIG. 5 illustrates an example flow diagram for testing the operation of a hardware decoder.

During operation of a hybrid decoder, the decoder manager can initially allocate the video feed from the subscription module 308 to a hardware decoder. The decoder manager can then monitor to determine if a failure has occurred with the decoder. To determine a response to a failure the decoder manage can determine if the failure is singular or a consistent failure. The distinction between a singular failure and consistent failure can be based on determining a failure rate. In a further aspect, the decoder manager can run a more comprehensive test as depicted in FIG. 5 on the hardware decoder to determine to consistency at which the hardware decoder is operating.

In evaluating the failure rate, the decoder manager can calculate the number of instances that the hardware decoder may fail in a predetermined period. If the hardware decoder functions properly after an initial failure, the hardware decoder can remain a viable candidate for subsequent use in decoding video streams. If the hardware decoder remains in a failure mode, the decoder manager can switch to software decoder as a backup.

During the consistency test, the decoder manager may evaluate the failure rate of the hardware decoder over multiple periods. The decoder manager can have failure rate threshold, such that if the hardware decoder continues to exceed the failure rate threshold for multiple testing periods, the decoder manger can decommission the hardware decoder. For example, if the hardware decoder fails 3 instances in 5 seconds for multiple 5 second intervals, the decoder manager may indicate that the hardware decoder has exceeding a failure point and needs to be replace. In another aspect, the decoder manager can be configured to decommission hardware decoder a based on a defined failure rate, comprising failure instances/evaluation period. Further, the decoder manager or other application will exclude the decommissioned hardware decoder in subsequent instances and another hardware decoder can be initialized for receiving a new video feed. Removing the decommissioned hardware decoders from the analysis can expedite the process of identifying or reassigning the video feed to a hardware video decoder or software video decoder. The results of a failure determination can also be reported to the display output as an indicator that one of the hardware components needs to be replaced or is incompatible with the format of the video feed.

In some implementations, computing platform(s) 302, remote platform(s) 304, and/or external resources 328 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 328 may be operatively linked via some other communication media.

A given remote platform 304 may include one or more processors configured to execute computer program modules. The computer program modules may be configured to enable an expert or user associated with the given remote platform 304 to interface with system 300 and/or external resources 328, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 328 may include sources of information outside of system 300, external entities participating with system 300, and/or other resources. In some implementations, some or all of the functionality attributed herein to external resources 328 may be provided by resources included in system 300.

Figure 4:
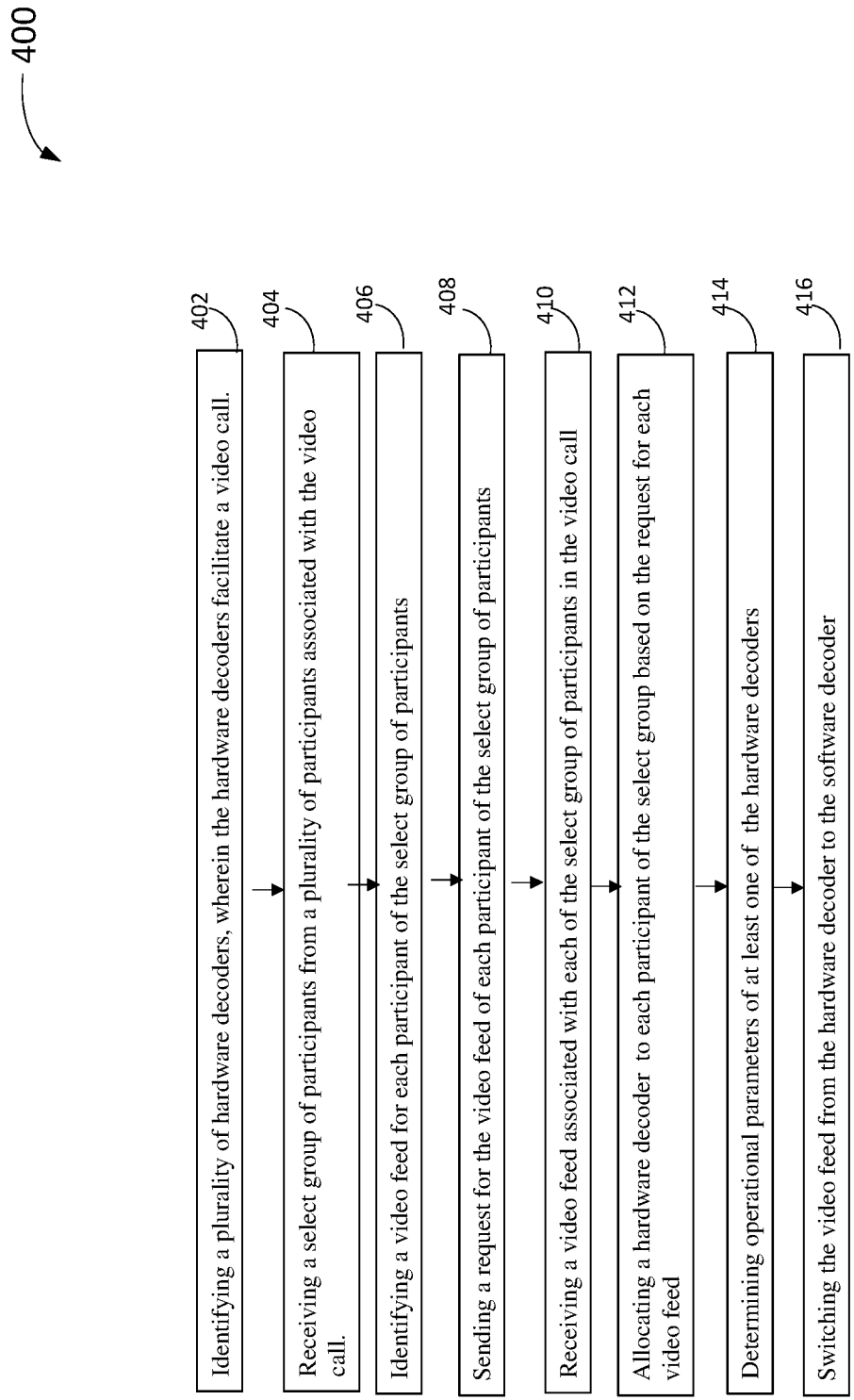
FIG. 4 illustrates an example flow diagram for determining the selection operation of a hardware decoder.

Computing platform(s) 302 may include electronic storage 330, one or more processors 332, and/or other components. Computing platform(s) 302 may include communication lines, or ports to enable the exchange of information with a network and/or other computing platforms. Illustration of computing platform(s) 302 in FIG. 4 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 332, information received from computing platform(s) 302, information received from remote platform(s) 304, and/or other information that enables computing platform(s) 302 to function as described herein.

Processor(s) 332 may be configured to provide information processing capabilities in computing platform(s) 302. As such, processor(s) 332 may include one or more of a digital processor, an analog processor, a digital circuit designed to process information, an analog circuit designed to process information, a state machine, and/or other mechanisms for electronically processing information. Although processor(s) 332 is shown in FIG. 3 as a single entity, this is for illustrative purposes only. In some implementations, processor(s) 332 may include a plurality of processing units. These processing units may be physically located within the same device, or processor(s) 332 may represent processing functionality of a plurality of devices operating in coordination. Processor(s) 332 may be configured to execute modules 308 and 310 and/or other modules. Processor(s) 332 may be configured to execute modules 308, and 310, and/or other modules by software; hardware; firmware; some combination of software, hardware, and/or firmware; and/or other mechanisms for configuring processing capabilities on processor(s) 332. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308 and/or 310 are illustrated in FIG. 3 as being implemented within a single processing unit, in implementations in which processor(s) 332 includes multiple processing units, one or more of modules 308 and 310 may be implemented remotely from the other modules. The description of the functionality provided by the different modules 308 and/or 310 described below is for illustrative purposes, and is not intended to be limiting, as any of modules 308 and/or 310 may provide more or less functionality than is described. For example, one or more of modules 308 and/or 310 may be eliminated, and some or all of its functionality may be provided by other ones of modules 308 and/or 310. As another example, processor(s) 332 may be configured to execute one or more additional modules that may perform some or all of the functionality attributed below to one of modules 308 and/or 310.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 4 illustrates an example flow diagram (e.g., process 400) for determining the similarities of post content for mapping into a hyperspace, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel.

At step 402, the process may include identifying a plurality of hardware decoders, wherein the hardware decoders facilitate a video call. Depending on the client device and the operating system, the system can determine an available number of hardware decoders that can be used to process a video feed. At step 404, the process can include receiving a select group of participants from a plurality of participants associated with the video call. The processor an received a determined subset of participants in the video call that the user of the client device seeks to focus and receive from the larger group of participants on the call. At step 406, the process can include identifying a video feed for each participant of the select group of participants. At step 408, the process can include sending a request for the video feed of each participant of the select group of participants. At step 410, the process can include receiving a video feed associated with each of the select group of participants in the video call. At step 412, the process 400 can include allocating a hardware decoder to each participant of the select group based on the request for each video feed. At step 414, the process 400 can include determining operational parameters of at least one of the hardware decoders. In determining the operation parameters, the system can be determining the efficiency in which the hardware decoder is operating. The operating parameters can include failures, failure rate, excessive latency or compatibility with video resolution. At step 416, the process can include switching the video feed from the hardware decoder to the software decoder. Based on analysis of the operational parameters, the processor or GPU can switch to operating with the software decoder. For example, if certain threshold values of the operational parameters are not met the system may respond with a failure of the hardware encoder. In other instances a minimum threshold not being exceed may also lead to a failure, requiring switch to the software decoder. For example, if the latency in the video stream may yield a video stream that may not be able to be processed by the hardware encoder.

In an alternate embodiment, the system can also make adjustments to the allocations of decoders when the client desires to view a different video feed than has already been allocated. For example, as depicted in FIG. 2, the decoder manager has allocated video feeds from user 1, user 2, user 3, and user 6. When the user wants to see the feed from user 7, the system can remove the feed from any of the currently allocated feeds. Referring back to step 408, the client device can make a request for user 2, user 3, user 6 and user 7. The decoder manager can make a comparison between the most recent request (e.g. user 2, user 3, user 6, and user 7) to the list of currently allocated quest (user1, user 2, user 3, and user 6). Referring back to step 412, any contradictions in the requests can be removed in favor of the most request (e.g. user 1 feed will be released in favor of allocating the availability to user 7 feed). In another aspect, the user can make a more direct request to switch video feeds (e.g. switch user 1 with user 7) wherein a release and allocation of available slots does not require an entire comparison between all of the currently allocated decoders.

As depicted in FIG. 5, the decoder manager can implement a testing process 500 different from the process 400. In decision block 502, the decoder module 310 can determine if there is a failure in the video feed with the hardware decoder. When there is no failure, the testing process 500 can follow the NO branch to block 504. At block 504 the system will continue receiving the video feed with the hardware (HW) decoder. Referring back to decision block 506 and following the YES branch to decision block 508, the decoder module 310 can determine if the hardware decoder remains in failure mode. Failure mode can comprise various errors in the receivable video feed including but not limited to: asynchronous audio and video within the video feed, decoder not output video, decoder cannot decode video on time, decoder crash. Following the NO branch from decision block 508, the process 500 can proceed to block 510, wherein the hardware decoder can be reinitialized with to receive a video feed. During reinitialization, a decoder can provide an initialization function. When the function is called, the decoder can reset. The hardware decoder can be originally initialized when the decoder manager assigns the hardware decoder to receive a video feed via the subscription module 308. In a further aspect, after a singular instance of failure, the decoder manager may reinitialize the once failed hardware decoder and proceed to block 504, wherein the video feed is continued.

Referring back to decision block 506, the process 500 can follow the NO branch to block 512, where in the decoder module 310 can determine how many failures occurred by the hardware decoder over a certain length of time (e.g. failure rate). The process 500 can proceed to decision block 514, wherein the decoder module 310 can determine whether the failure rate exceeds the replacement threshold. For example, if the HW decoder fails multiple times with within a period of time (e.g. 5 failures in 2 seconds) and the same failure rate occurs in multiple testing periods, the replacement threshold may be exceeded. From decision block 514, the process 500 can follow the NO brank the block 510, wherein the hardware decoder is reinitialized. Referring back to decision block 508 and decision block 514, following the YES branch, the process can proceed to block 516 wherein the decoder module 310 can remove (decommission) a hardware encoder from further use and switch the assigned feed to that decoder to a software encoder.

Figure 6:
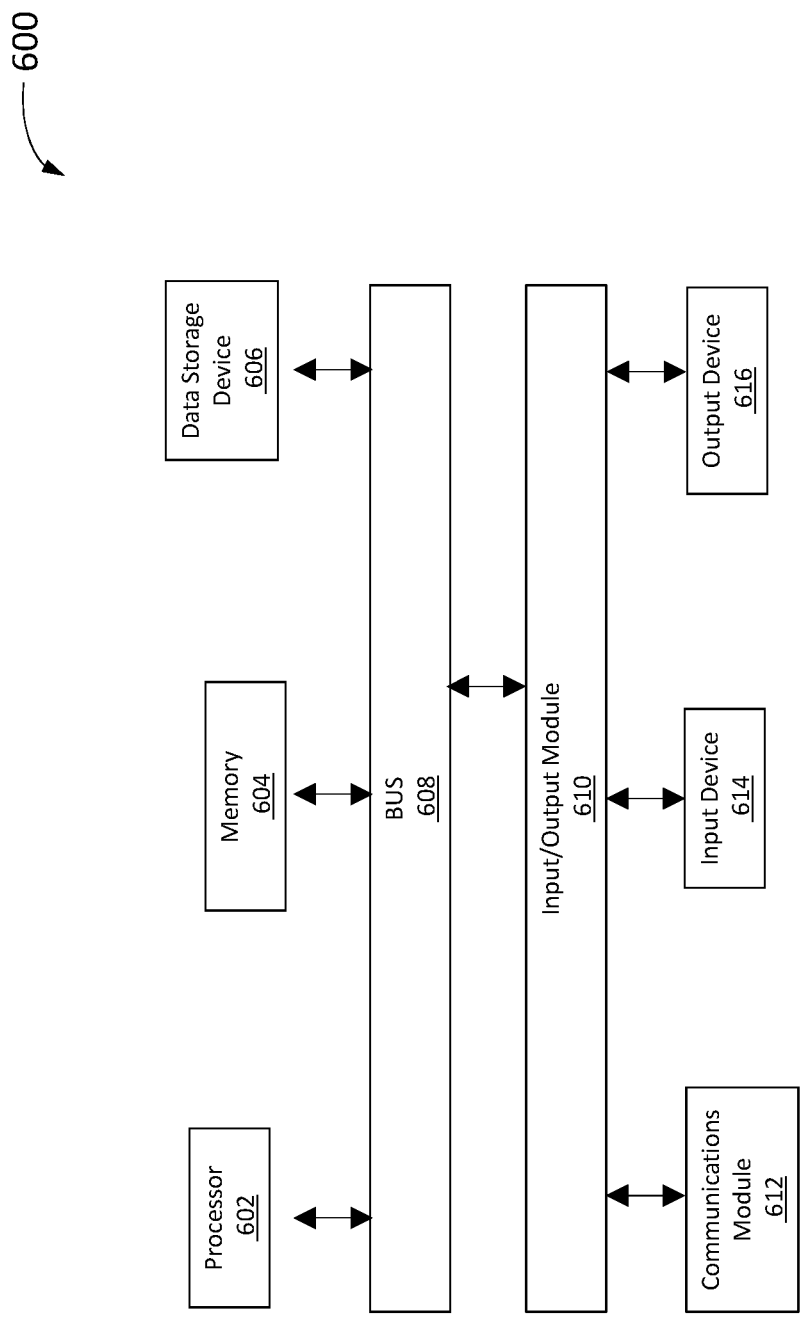
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

In various implementations, the computing system 600 can include a single computing device or multiple processors 602 that communicate over wired or wireless channels to distribute processing and share input data.

Computer system 600 (e.g., server and/or client) includes a bus 608 or other communication mechanism for communicating information, and a processor 602 coupled with bus 608 for processing information. By way of example, the computer system 600 may be implemented with one or more processors 602 (e.g., central processing units (CPUs), graphical processing units (GPUs), holographic processing units (HPUs), etc.). Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The code can also be a software video decoder to process a video feed for subsequent display on an output device 616 The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B. or only C; any combination of A, B, and C; and/or at least one of each of A, B, and C.

To the extent that the terms "include." "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method is disclosed that includes identifying a plurality of participants associated with a video call, the method comprising:
   identifying a plurality of hardware decoders, wherein the hardware decoders facilitate a video call;
   receiving a select group of participants from a plurality of participants associated with the video call;
   identifying a video feed for each participant of the select group of participants;
   sending a request for the video feed of each participant of the select group of participants receiving a video feed associated with each of the select group of participants;
   determining a failure for a hardware decoder of the plurality of hardware decoders;
   based on the failure exceeding a replacement threshold after multiple test periods, decommissioning the hardware decoder, wherein decommissioning comprises excluding the decommissioned hardware decoder from an analysis to assign the video feed to another hardware decoder;
   allocating the another hardware decoder of the plurality of hardware decoders to each participant of the select group based on the request for each video feed.

2. The method of claim 1 further comprising, determining a threshold value for the number of hardware decoders.

3. The method of claim 1 further comprising displaying each video feed associated with each of the select group of participants.

4. The method of claim 1 further comprising releasing an unallocated hardware decoder for use by a client device.

5. The method of claim 1 further comprising reinitializing the hardware decoder based on allocating the hardware decoder.

6. A system configured identifying a plurality of participants associated with a video call:
   one or more hardware processors configured by machine-readable instructions to: identify a plurality of hardware decoders, wherein the hardware decoders facilitate a video call,
   receiving a select group of participants from a plurality of participants associated with the video call,
   identify a video feed for each participant of the select group of participants; send a request for the video feed of each participant of the select group of participants;
   receive a video feed associated with each of the select group of participants; allocate a hardware decoder of the plurality of hardware decoders to each participant of the select group based on the request for each video feed
   determine a failure for the hardware decoder of the plurality of hardware decoders;
   based on the failure exceeding a replacement threshold after multiple test periods, decommissioning the hardware decoder, wherein decommissioning comprises excluding the decommissioned hardware decoder from an analysis to assign the video feed to another decoder; and
   switch the video feed to software decoder from the decommissioned hardware decoder.

7. The system of claim 6, wherein the processor is further configured to determine the value for the number of hardware decoders.

8. The system of claim 6, wherein the processor is further configured to display each video feed associated with each of the select group of participants.

9. The system of claim 6 further comprising releasing an unallocated hardware decoder for use by a client device.

10. The system of claim 6, wherein the processor is further configured to reinitializing the hardware decoder based on allocating the hardware decoder.

11. A non-transient computer-readable storage medium having instructions embodied thereon, the instructions being executable by one or more processors to perform a method for allocating a hardware decoder for a video feed, the method comprising:
   identifying a plurality of hardware decoders, wherein the hardware decoders facilitate a video call;
   receiving a select group of participants from a plurality of participants associated with the video call;
   identifying a video feed for each participant of the select group of participants;
   sending a request for the video feed of each participant of the select group of participants receiving a video feed associated with each of the select group of participants;
   determining a failure for a hardware decoder of the plurality of hardware decoders;
   based on the failure exceeding a replacement threshold after multiple test periods, decommissioning the hardware decoder, wherein decommissioning comprises excluding the decommissioned hardware decoder from an analysis to assign the video feed to another hardware decoder; and
   allocating the another hardware decoder of the plurality of hardware decoders to each participant of the select group based on the request for each video feed.

* * * * *